United States Patent
Hoff et al.

(10) Patent No.: US 8,904,344 B2
(45) Date of Patent: Dec. 2, 2014

(54) MANAGING CHARACTERISTICS VARIATION WITHIN SOFTWARE SOLUTION PACKAGES

(75) Inventors: Roland Hoff, Walldorf (DE); Peter Christiansen, Weisloch (DE); Werner Huff-Huebner, Dossenheim (DE)

(73) Assignee: SAP SE, Walldorf (DE)

( * ) Notice: Subject to any disclaimer, the term of this patent is extended or adjusted under 35 U.S.C. 154(b) by 283 days.

(21) Appl. No.: 13/100,313

(22) Filed: May 4, 2011

(65) Prior Publication Data
US 2012/0284703 A1 Nov. 8, 2012

(51) Int. Cl.
G06F 9/44 (2006.01)
G06F 9/445 (2006.01)

(52) U.S. Cl.
CPC ........................ *G06F 8/61* (2013.01)
USPC ............ 717/104; 717/105; 717/106; 717/109

(58) Field of Classification Search
None
See application file for complete search history.

(56) References Cited

U.S. PATENT DOCUMENTS

2005/0204332 A1* 9/2005 Krishnan et al. .............. 717/102

* cited by examiner

*Primary Examiner* — Qamrun Nahar

(57) ABSTRACT

Various embodiments of systems and methods for managing characteristics variations within solution packages are described herein. In one aspect, the method includes displaying one or more identifiers corresponding to one or more solution packages, receiving a user selection of the solution package, rendering industries and countries supported by the selected solution package, receiving a user selection of at least one of the countries and the industries, based upon the selection of at least one of the one or more countries and the one or more industries, identifying modeling element(s) associated with the solution package, receiving a user selection of the modeling element, and based upon the user selection, providing one or more configuration blocks for configuring the selected solution package by setting or configuring the corresponding one or more characteristics of the modeling element. The configuration may be for specifying applicable industries and/or countries for the modeling element.

20 Claims, 10 Drawing Sheets

MANAGING CHARACTERISTICS VARIATION WITHIN SOFTWARE SOLUTION PACKAGES

FIELD

The technical field relates generally to software solution packages, and more particularly to managing characteristics variation within software solution packages.

BACKGROUND

Business software is generally any software that helps an enterprise to manage its business. The business software may be categorized as individual business software (that caters to a specific need of a specific enterprise) and standard business software (that caters to the specific need of several enterprises). For example, a CRM (Customer Relationship Management) software is the standard business software that caters to the customer relationship management of several enterprises. The enterprise may deal in various industries and may have various branches all over the globe. The standard business software may be configured based upon the type of industries (i.e., verticalisation) and/or countries (i.e., globalization) where the business software has to be implemented. For example, if the enterprise 'A' deals in telecommunication, transport, and medicine industries and has branches all over the globe, the enterprise 'A' can configure the standard business software (e.g., CRM) to cater to the need of its various industries and branches.

The standard business software is generally configured by a software developer or a software consultant of the enterprise. Essentially, the software consultant is provided training to configure (customize) and/or maintain the standard business software based upon the requirement of the enterprise. However, the training provided to the software consultant is very costly and time consuming. Further, the enterprise may be interested in the specific domain of the standard business software (e.g., Activity and Opportunity Process within CRM) however, the software consultant has to undergo training in all aspects of the CRM which is again time-consuming.

A software solution package (e.g., Rapid Deployment Solution by SAP®) is developed to address the above mentioned problems. Essentially, the software solution package includes the standard business software along with a training material (modeling charts/maps, etc.). The training material can be easily referred to by the software consultants. The training material helps in installing the standard business software in the enterprise. Essentially, the software solution package helps the software consultant in installing and configuring the standard business software without undergoing the time consuming and costly training. Further, the software solution package may include specific standard business software with a well defined scope of business functionality which helps the consultant to implement the solution package in the domain of interest, e.g., a payroll within HR (Human Resources).

The software solution package also includes a configuration list that defines a business scenario (business circumstances), one or more business processes associated with the business scenario, and one or more process steps associated with each business processes. Essentially, the configuration list specifies each process step and the business software that is to be executed for realizing the process step. Usually, the software consultant manually configures the configuration list to specify the software(s) to be executed for one or more process steps.

However, it might be inconvenient and time consuming for the software consultant to manually configure or prepare the configuration list. Further, the software to be used for a given process step may vary depending on number of characteristics, e.g., a country and/or industry in which the process step has to be implemented. For example, the process step "paying taxes" differs across countries while the process steps related to "logistics" differs across industries. Furthermore, it might be troublesome for the software consultant to manually configure or prepare the list with all possible characteristic variations. Again, it might be inconvenient for the software consultant to repeat configuration of the process steps for various industries/countries. Additionally, it might also be difficult and time consuming to define rule(s) and exception(s) that govern each process step. Finally, it may also be inefficient and inconvenient for the software consultant and a software provider to have individual solution packages for every combination of industry and country with only small deviations inside the solution packages.

It would be desirable, therefore, to efficiently manage characteristics variation within software solution packages that among other things obviates the above mentioned problems.

SUMMARY OF THE INVENTION

Various embodiments of systems and methods for managing characteristics variation within software solution packages are described herein. In one aspect, a method includes displaying one or more identifiers corresponding to one or more solution packages, receiving a user selection of the solution package, rendering one or more industries and one or more countries supported by the selected solution package, receiving a user selection of at least one of the one or more countries and the one or more industries, based upon the selection of at least one of the one or more countries and the one or more industries, identifying modeling element(s) associated with the solution package, receiving a user selection of the modeling element comprising one or more characteristics, and based upon the user selection, providing one or more configuration blocks to configure the selected solution package by setting or configuring the corresponding one or more characteristics of the modeling element. The configuration for specifying applicable industries (verticalisation) and/or countries (globalization) for the modeling element (e.g., process step) makes the solution packages very flexible and reusable. Essentially, the modeling element can be configured easily and efficiently using the configuration block(s).

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for managing characteristics variation within solution packages are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
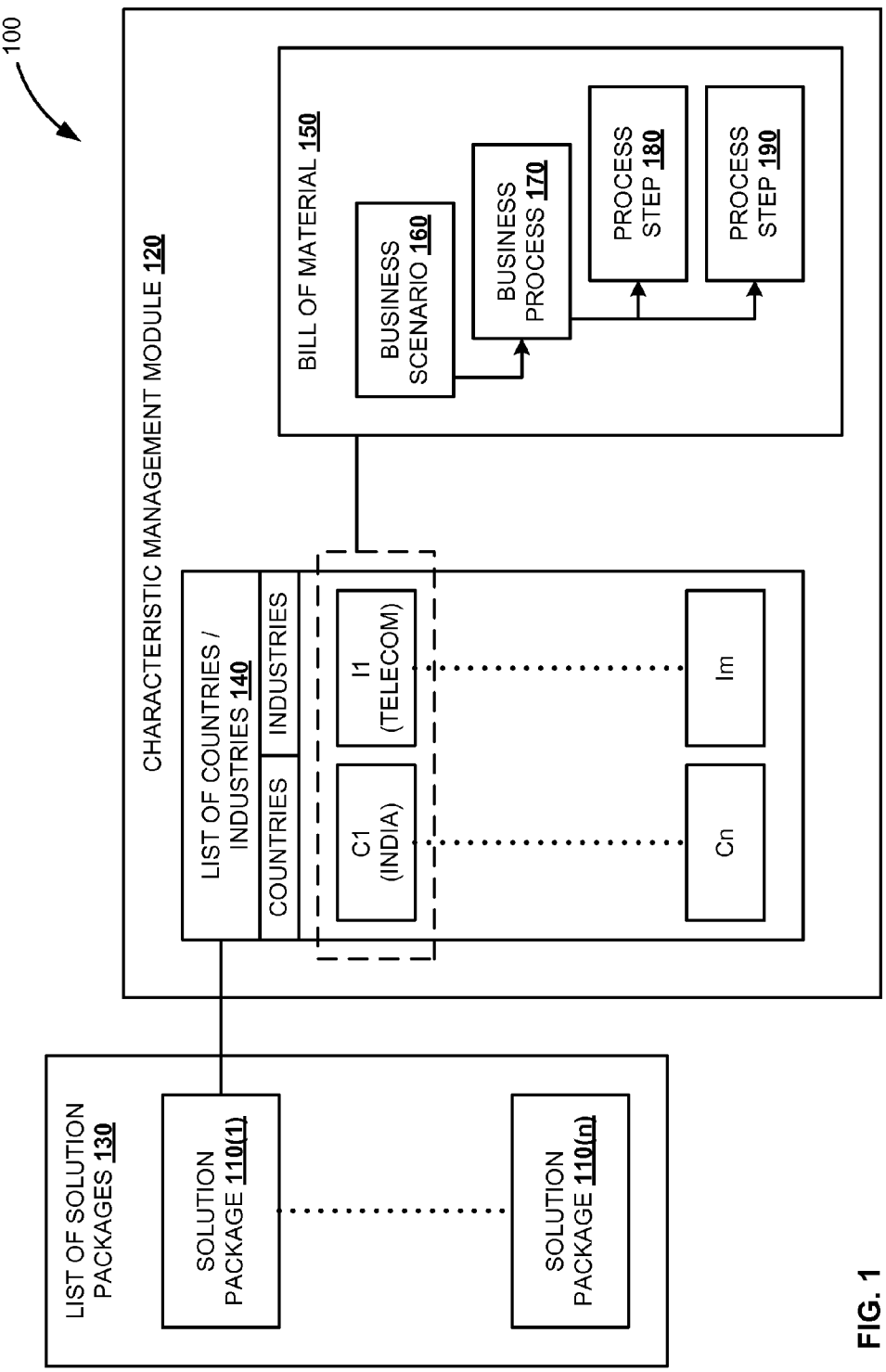
FIG. 1 is a block diagram of a system including a characteristics management module for managing characteristics of solution packages, according to an embodiment of the invention.

FIG. 1 illustrates one embodiment of a system 100 for managing characteristics variation within solution packages 110 (1-$n$) using a characteristics management module 120. Essentially, a user interface shows a list 130 to a user. The list 130 includes one or more identifiers (not shown) corresponding to one or more solution packages 110 (1-$n$) to the user. The user may select a solution package 110(1) from the list 130 based upon a business requirement. Essentially, the user selects the identifier corresponding to the solution package 110(1) to select the solution package 110(1). Once the solution package 110(1) is selected by the user, the characteristics management module 120 displays a list 140 (i.e., a list of countries/industries). The list 140 displays one or more countries (C1-Cn) and one or more industries (I1-Im) supported by the solution package 110(1). The user selects a country C1 and/or an industry I1 from the list 140. Based upon the selected country C1 and/or the industry I1, the characteristics management module 120 identifies a Bill-of-Material (BOM) 150 for the solution package 110(1). The BOM 150 includes one or more modeling elements (160-190). The modeling elements (160-190) may be configured based upon the user's requirement. Essentially, the characteristics management module 120 provides one or more configuration blocks (not shown) for configuring the selected solution package 110(1) by configuring or setting each of the modeling elements (160-190) of the solution package 110(1).

The solution package 110(1) may be selected from the list 130 based upon the requirement of a business enterprise. The list 130 includes the identifier corresponding to the solution package 110(1). The identifier may be at least one of a textual label (e.g., 'CRM Rapid Deployment Solution') and a symbol. The identifier corresponding to the solution package 110(1) may be selected to select the solution package 110(1). Essentially, the user selects the solution package 110(1) based upon the requirement of the business enterprise. The list 130 includes various types of solution packages for business enterprises, e.g., 'CRM Rapid Deployment for Sales', 'SAP® Extended Warehouse Management Rapid-Deployment Solution', 'IT Service Desk Operation' etc. If the user is interested in sales requirement of the enterprise, the user may select 'CRM Rapid Deployment for Sales' from the list 130. Essentially, the user analyzes the list 130 to select the solution package 110(1).

Once the solution package 110(1) is selected from the list 130, the characteristic management module 120 renders the list 140. The list 140 illustrates the countries (C1-Cn) and/or the industries (I1-Im) supported by the solution package 110 (1) (i.e., for which the solution package 110(1) is applicable). The user may select the one or more countries and/or the one or more industries from the list 140, based upon the requirement. For example, the user (e.g., the software consultant) who configures the software for use in a telecommunication industry located in India may select the industry I1 (Telecom) and the country C1 (India) from the list 140.

Once the country C1 and the industry I1 are selected from the list 140, the characteristics management module 120 identifies the BOM 150 applicable for the selected country C1 and the industry I1. The BOM 150 includes the modeling elements (160-190). The modeling element may be a business scenario (business circumstance) 160, a business process 170 associated with the business scenario 160, and a process step (180 or 190) associated with the business process 170. Essentially, the BOM 150 may include one or more business scenarios. Each of the business scenarios includes one or more business processes, e.g., the business scenario 160 includes the business process 170. Each business process intern includes one or more process steps, e.g., the business process 170 includes the process steps (180-190).

Each modeling element (160-190) has one or more characteristics associated with it. The characteristics may be a country, an industry, and a product. For example, the business scenario 160 may have two characteristics namely a country characteristic and an industry characteristic. Similarly, the business process 170 or the process steps (180-190) may also have the characteristics namely the country characteristic and the industry characteristic associated with it.

The characteristic (e.g., industry or country) of the modeling element (e.g., the process step 190) has one or more values. For example, the country characteristic of the process step 190 may have values {India, Pakistan, and China} and the industry characteristic of the process step 190 may have values {Automotive and Telecommunication}. Essentially, the user can configure one or more characteristics (e.g., country characteristic, industry characteristic, etc.) of the modeling element (e.g., the process step 180). The user configures the characteristic (e.g., country) of the modeling element (e.g., the process step 190) by specifying/assigning the values (e.g., India and China) for the characteristic (i.e., the country).

The BOM 150 may be analyzed to identify the modeling element and the characteristic(s) of the modeling element that is required to be configured. For example, the user may analyze the BOM 150 of the solution package 'CRM Sales' or 110(1) that includes the following modeling elements:

Business Scenario 160: 'Sell-from-stock'
    Business Process 170: 'Sales Order Processing'
        Process step 180: 'Determine Pricing'
        Process step 190: 'Determine Taxes'

It may be analyzed that the process step 190, i.e., the determination of taxes varies from country to country and therefore, the process step 190 (modeling element 190) may be required to be configured. Essentially, if the solution package 110(1) is required to be implemented in 'Brazil', the user needs to configure the country characteristic of the process step 190.

Figure 2:
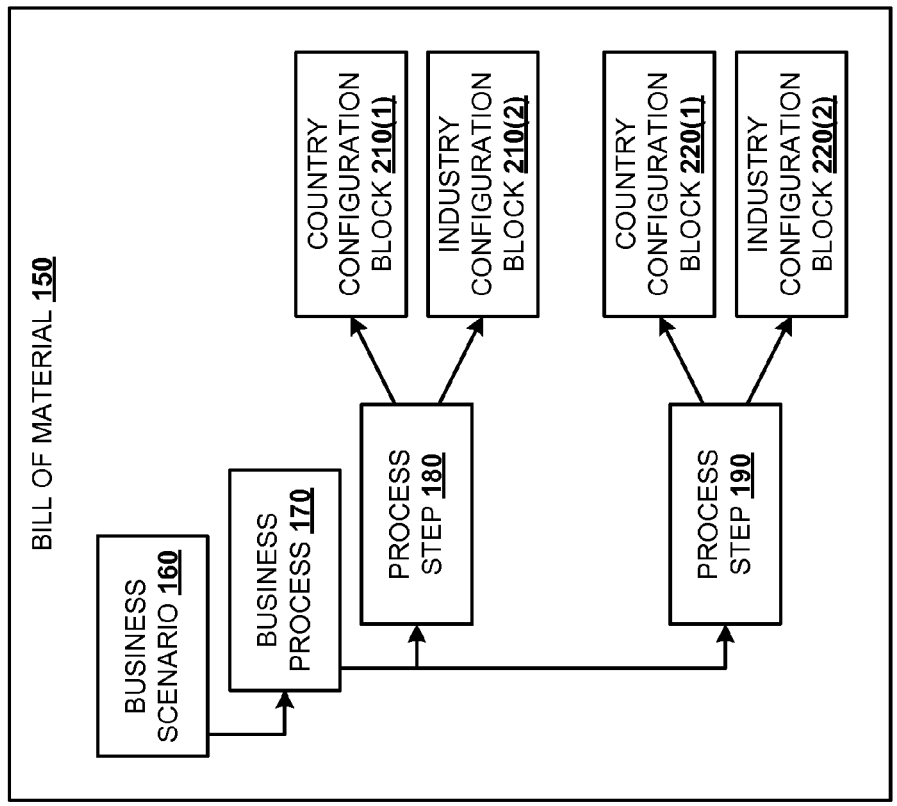
FIG. 2 is a block diagram of a Bill-of-Material (BOM) of a solution package, the BOM including modeling elements and configuration blocks for configuring the modeling elements, according to an embodiment of the invention.

The modeling element (e.g., the process step 190) is configured using the one or more configuration blocks. Essentially, each characteristic (country, industry, etc.) of the modeling element (e.g., the process step 190) may be configured using a corresponding configuration block. The country characteristic of the modeling element may be configured using a country configuration block and the industry characteristic of the modeling element may be configured using an industry configuration block. There may be other configuration blocks related to other characteristics, e.g., product type, etc. For example, the country characteristic of the process step 180 may be configured using the country configuration block 210(1) (refer to FIG. 2) and the industry characteristic of the process step 180 may be configured using the industry configuration block 210(2) (refer to FIG. 2). Similarly, the country characteristic of the process step 190 may be configured using the country configuration block 220(1) (refer to FIG. 2) and the industry characteristic of the process step 190 may be configured using the industry configuration block 220(2) (refer to FIG. 2)

Figure 3:
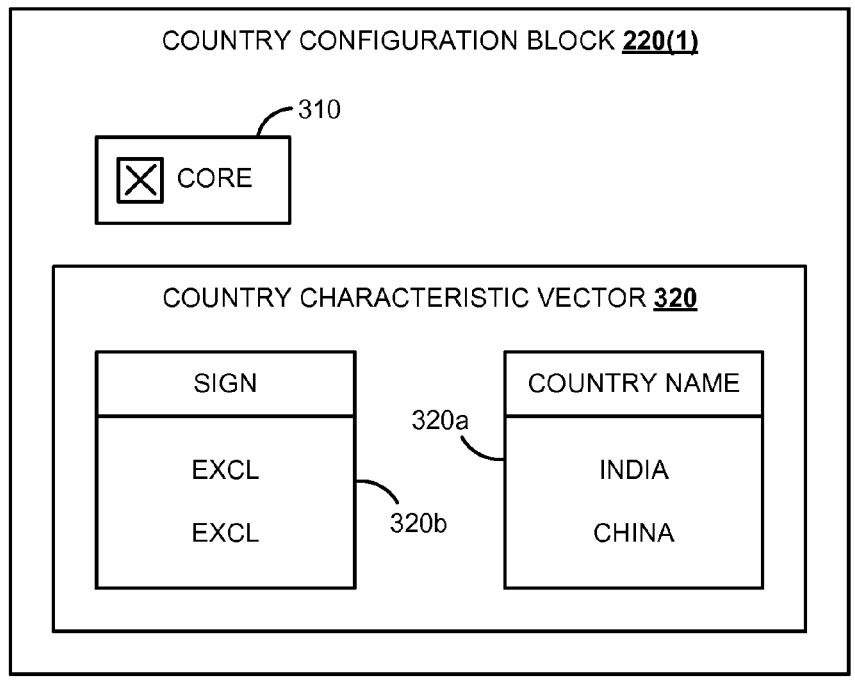
FIG. 3 is a block diagram of a country configuration block of the modeling element, according to an embodiment of the invention.

FIG. 3 illustrates a general structure of the country configuration block 220(1). The country configuration block 220(1) comprises a selectable core 310 and a country characteristic vector 320. The selectable core 310 is a collection or a set of predefined values that can be collectively selected or de-selected. The selectable core 310 may be represented by, e.g., a checkbox. The user may select the selectable core 310 (e.g., by checking the checkbox). If the selectable core 310 is selected, one or more predefined values of the characteristic (i.e., country) become applicable for the modeling element (i.e., process step 190). The user may also specify one or more exceptions using the country characteristic vector 320.

The country characteristic vector 320 includes at least two fields 320(*a-b*). One of the two fields (i.e., first field 320*a*) receives one or more values of the characteristics (country). Essentially, the user enters the value(s) of the characteristic (country) in the first field 320*a*. For example, the user may enter 'India' and 'China' as the values of the characteristic (i.e., country) in the first field 320*a*. Another of the two fields (i.e., second field 320*b*) is configured to receive a selection criterion for the respective values of the characteristic (i.e., India and China). The selection criterion may include an option for including or excluding the value(s) of the characteristic. For example, the selection criteria may be one of an 'INCL' and 'EXCL'. Essentially, the user may either enter 'INCL' or 'EXCL' for each of the values of the characteristic (India and China) mentioned in the first field 320*a*. The 'INCL' indicates the value of the characteristic to be included and the 'EXCL' indicates the value of the characteristic to be excluded (i.e., not applicable for the process step 190). For example, India and China are excluded, i.e., not applicable for the process step 190, as illustrated in FIG. 3.

Figure 4:
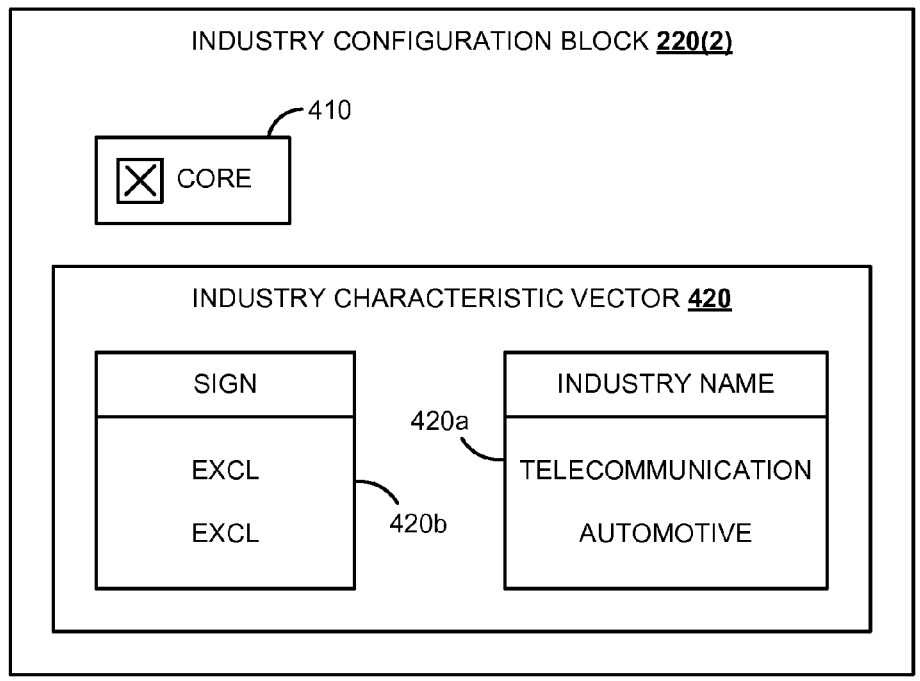
FIG. 4 is a block diagram of an industry configuration block of the modeling element, according to an embodiment of the invention.

FIG. 4 illustrates a general structure of the industry configuration block 220(2). The industry configuration block 210(2) comprises a selectable core 410 and an industry characteristic vector 420. The user may select the selectable core 410 (e.g., by checking the checkbox). If the selectable core 410 is selected, one or more predefined values of the characteristic (i.e., industry) become applicable for the modeling element (i.e., process step 190). The user may also specify one or more exceptions using the industry characteristic vector 420.

The industry characteristic vector 420 includes at least two fields 420(*a-b*). One of the two fields (i.e., first field 420*a*) receives one or more values of the characteristics (industry). Essentially, the user enters the value(s) of the characteristic (industry) in the first field 420*a*. For example, the user may enter 'Telecommunication' and 'Automotive' as the values of the characteristic (i.e., industry) in the first field 420*a*. Another of the two fields (i.e., second field 420*b*) is configured to receive the selection criterion for the respective values of the characteristic (i.e., Telecommunication and Automotive). The selection criterion may be one of the 'INCL' and 'EXCL'. Essentially, the user may either enter 'INCL' or 'EXCL' for each of the values of the characteristic (Telecommunication and Automotive) mentioned in the first field 420*a*. The 'INCL' indicates the value of the characteristic to be included and the 'EXCL' indicates the value of the characteristic to be excluded (i.e., not applicable for the process step 190). For example, Telecommunication and Automotive are excluded, i.e., not applicable for the process step 190, as illustrated in FIG. 4.

Figure 5A:
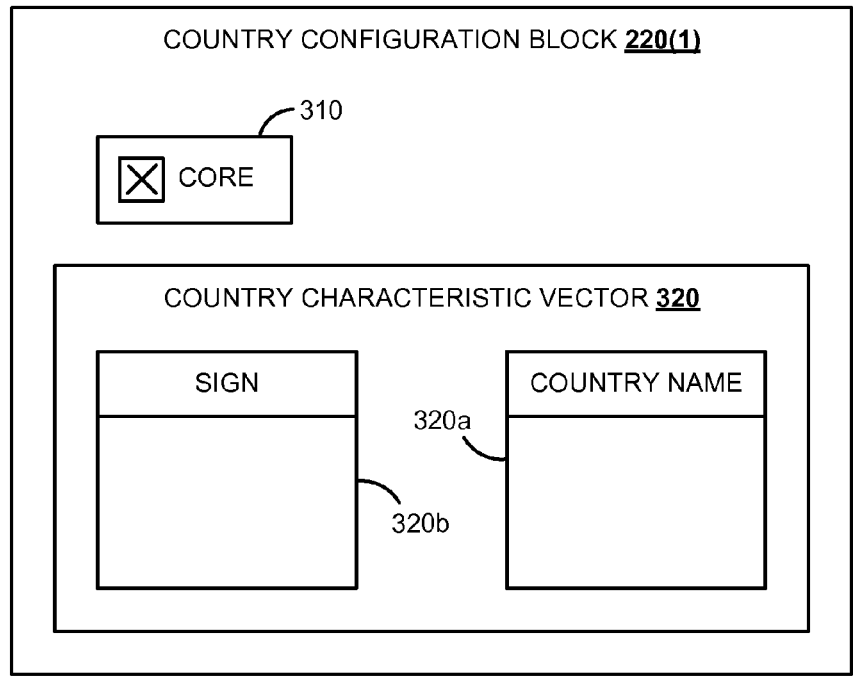
FIGS. 5A-5E are block diagrams of various configuration of the country configuration block, according to an exemplary embodiment of the invention.
Figure 5B:
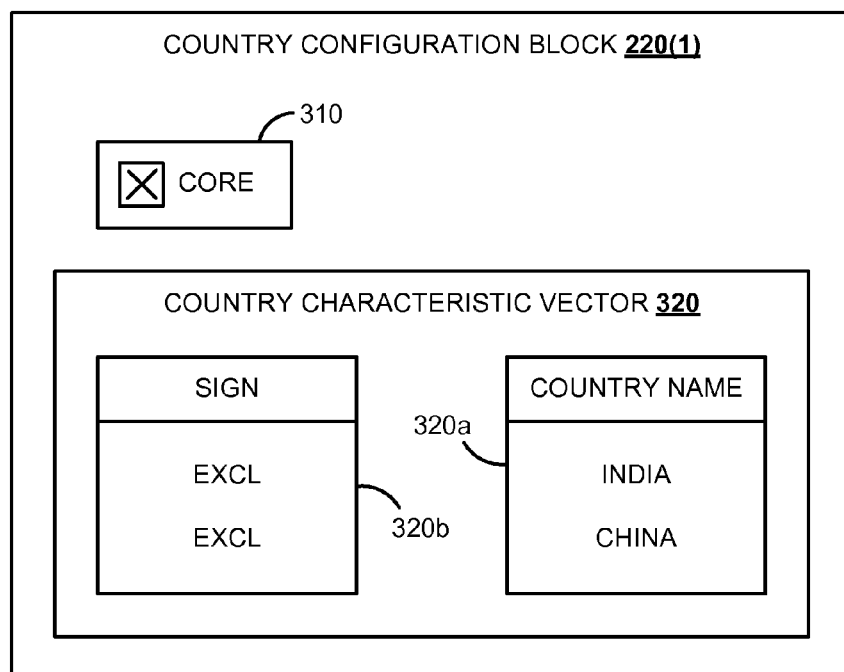
Figure 5C:
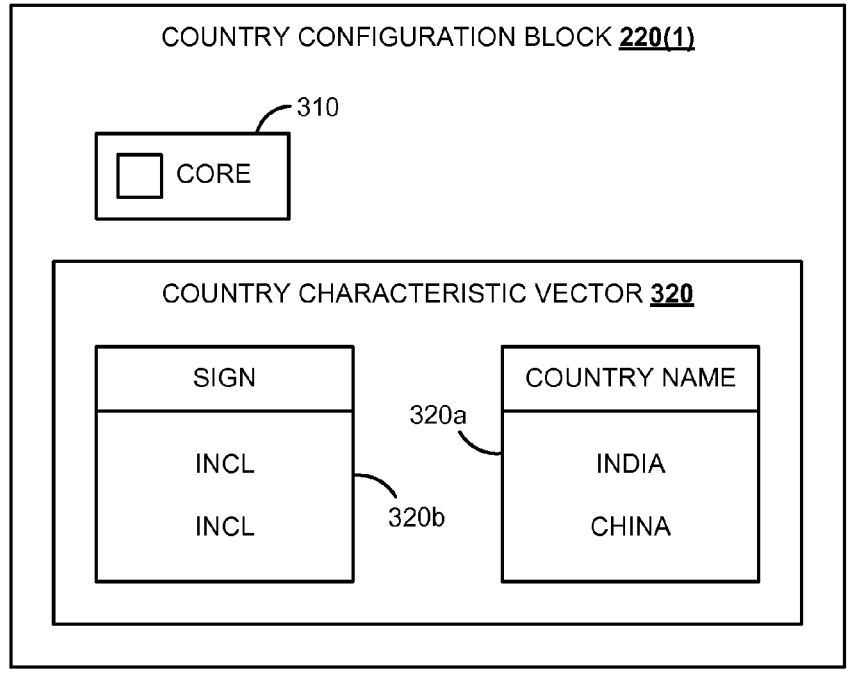
Figure 5D:
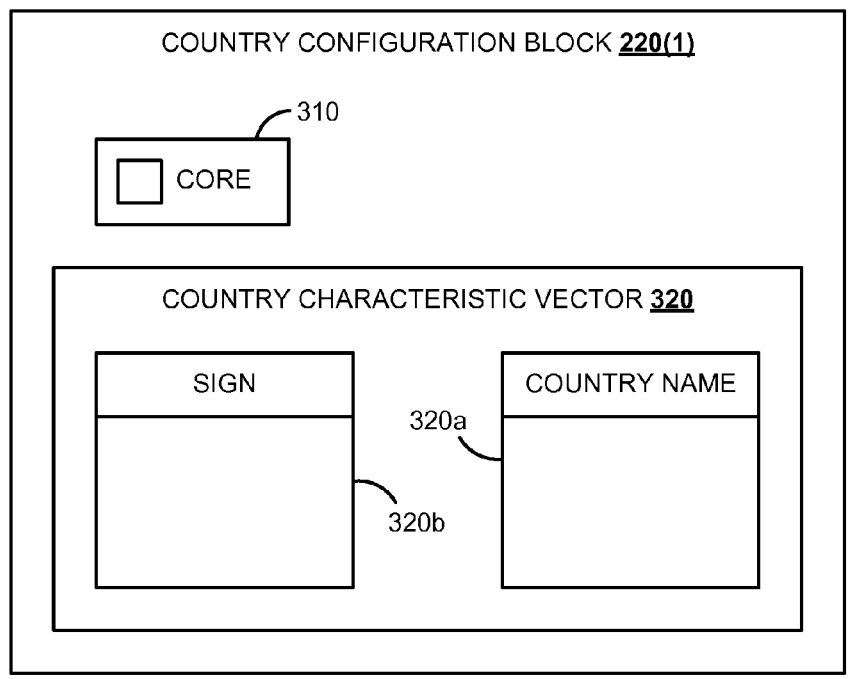
Figure 5E:
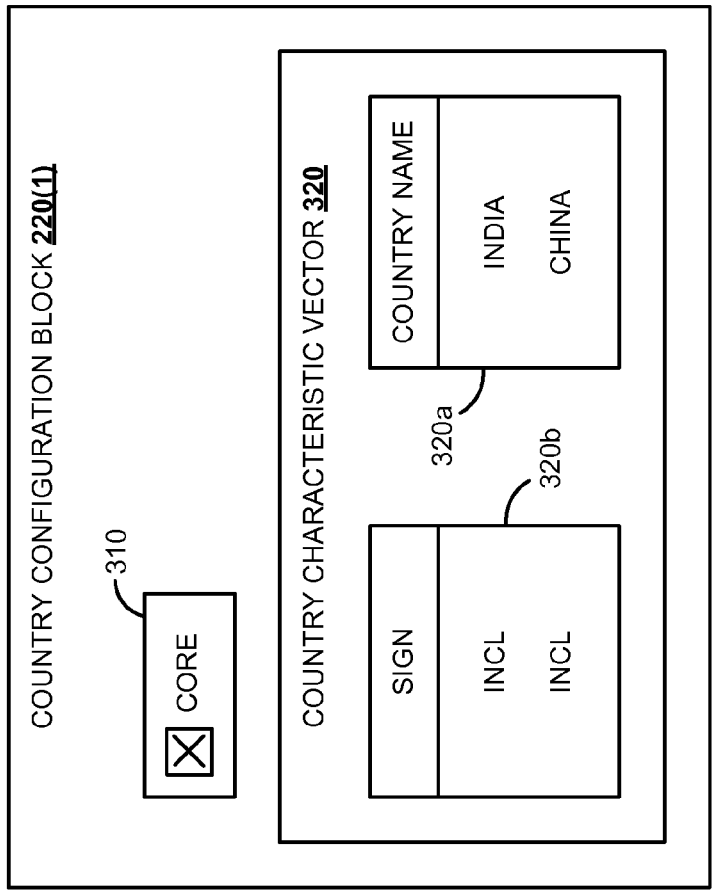

FIGS. 5A-5E illustrate various exemplary configuration of the country configuration block 220(1) of the process step 190. Various combinations of the selectable core 310 and the country characteristic vector 320 may be possible within the country configuration block 220(1). In one embodiment, the following rules may be applied for determining visibility (applicability) of the process step 190 for different values of the country configuration block 220 (1):

1) Rule 1: if the selectable core 310 is selected and nothing is specified in the country characteristic vector 320 then the process step 190 becomes visible (applicable) for one or more predefined values of the characteristic (i.e., country), as illustrated in FIG. 5A;
2) Rule 2: if the selectable core 310 is selected and one or more values of the characteristic or country (e.g., India and China) are specified in the country characteristic vector 320 as 'EXCL' then the process step 190 becomes visible (applicable) for the predefined values of the characteristic (i.e., country) except for the values excluded by the characteristic vector (i.e., India and China), as illustrated in FIG. 5B;
3) Rule 3: if the selectable core 310 is not selected and one or more values (India and China) are specified in the country characteristic vector 320 as 'INCL' then the process step 190 only becomes visible (applicable) for the values specified in the country characteristic vector 320 (i.e., the values having 'INCL' as the selection criterion), as illustrated in FIG. 5C;
4) Rule 4: If the selectable core 310 is not selected and the characteristics vector 320 is also not specified then the process step 190 becomes visible (applicable) for the predefined values of the characteristic (i.e., country), as illustrated in FIG. 5D; and 5) Rule 5: if the selectable core 310 is selected and the country characteristic vector 320 includes selection criterion as 'INCL' for the values (India and China) then there is no effect of the country characteristic vector 320 and the process step 190 becomes visible (applicable) for the predefined values of the characteristic (i.e., country), as illustrated in FIG. 5E.

Similar configurations (rules) may be defined or specified for the industry configuration block 220(2) of the process step 190.

Figure 6:
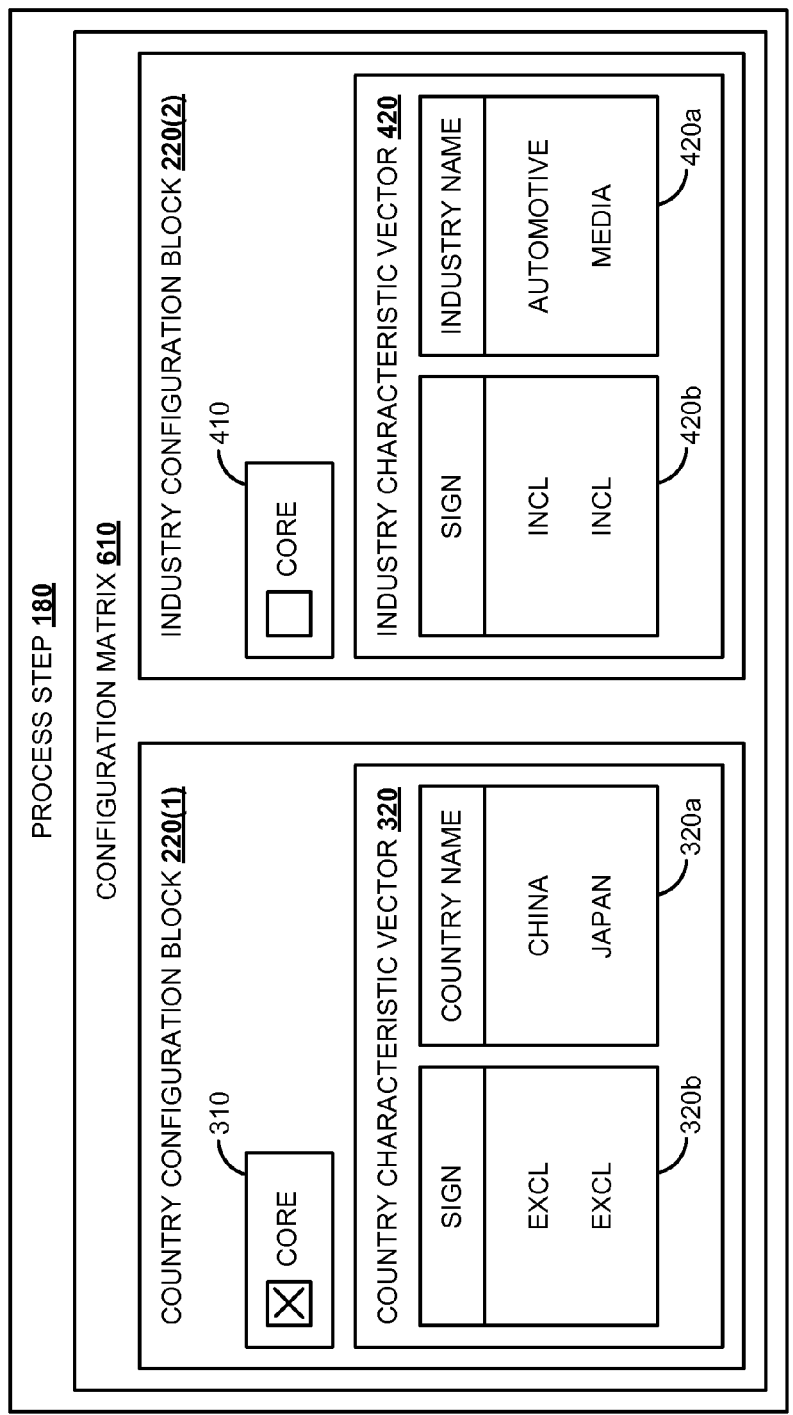
FIG. 6 is a block diagram of a configuration matrix including the country configuration block and the industry configuration block, according to an embodiment of the invention.

In one embodiment, as illustrated in FIG. 6, the configuration blocks, e.g., the country configuration block 220(1) and the industry configuration block 220(2) may be included inside a configuration matrix 610. Essentially, the configuration matrix 610 may be defined for the modeling element, e.g., the process step 190. The configuration matrix 610 illustrates the applicability or visibility of the modeling element (e.g., the process step 190) relative to the country and the industry. For example, the configuration matrix 610 illustrates that the process step 190 is applicable or visible only for the industries 'Automotive' and 'Media' and for all the predefined countries except for China and Japan.

Each modeling element, e.g., the process step 190, has one or more features. The feature of the modeling element may be a name of the modeling element, a description of the modeling element, and a flow diagram of the modeling element, etc. Essentially, the feature (e.g., name) of the process step 190 may be different for different values (India and China) of the characteristic (country). The feature (e.g., name) may be different for different values of the same characteristic and/or different characteristic. For example, for the value (Automotive) of the industry characteristic, the name (i.e., feature) of the process step 190 may be "Leasing Contract", for another value (Utility) of the industry characteristic, the name of the process step 190 may be "Utility Contract", and for the value (Brazil) of the country characteristic, the name of the process step 190 may be "Brazil contract."

In one embodiment, each value of the industry characteristic (e.g., Automotive and Utility) may be combined with each value of the country characteristic (e.g., Brazil) to form several combinations as follows:

| Combination # | Country | Industry |
|---|---|---|
| 1 | Brazil | Utility |
| 2 | Brazil | Automotive |

Each combination (i.e., combination #1 and combination #2) is applicable for the process step 190. The feature (e.g., name) of the process step 190 for the value of the country characteristic (Brazil) and the values of the industry characteristic (Utility and Automotive) are as follows:

| Country | Name (process step 190) | Industry | Name (process step 190) |
|---|---|---|---|
| Brazil | Brazil Contract | Utility | Utility Contract |
| | | Automotive | Leasing Contract |

A resultant name (feature) of the process step 190 for the combination #1 (i.e., the utility industry in Brazil) and the combination #2 (i.e., the automotive industry in Brazil) may be determined using a deviation rule (cross dependent deviation). The deviation rule may be that the resultant name (feature) of the modeling element is a combination of the features of the values of characteristics of the modeling element. For example, for the Utility industry in Brazil (combination #1), the resultant name of the process step 190 may be the combination of "Utility Contract" and "Brazil Contract" (e.g., the resultant name may be "Utility Contract in Brazil"). Similarly, the resultant name of process step 190 for Automotive industry in Brazil (combination #2) may be the combination of "Leasing Contract" and "Brazil Contract" (e.g., the resultant name may be "Brazil Leasing Contract").

The resultant name of the process step 190 (using the deviation rule) may be listed as:

| Combination # | Country | Industry | Resultant name (process step 190) |
|---|---|---|---|
| 1 | Brazil | Utility | Utility Contract in Brazil |
| 2 | Brazil | Automotive | Brazil Leasing Contract |

In one embodiment, the user may trigger a cross deviation button (icon) to activate the deviation rule. If the user triggers the cross deviation button, the deviation rule may be applied and the resultant feature may be determined as the combination of the features of the values of characteristics of the modeling element. In another embodiment, the deviation rule may be that the resultant feature is a predefined feature. The predefined feature may be specified by the user or the predefined feature may be one of the features of one of the characteristics. In yet another embodiment, if the cross deviation button is not triggered, the resultant feature may be determined as the predefined feature. Various combinations of the country and the industry along with the resultant feature of the modeling element for each combination may be used to automatically generate a configuration list (not shown). Further, it should be noted that the above-mentioned countries and/or industries are just provided for convenience of understanding without the need to execute the embodiment(s) in these countries and/or industries.

Figure 7:
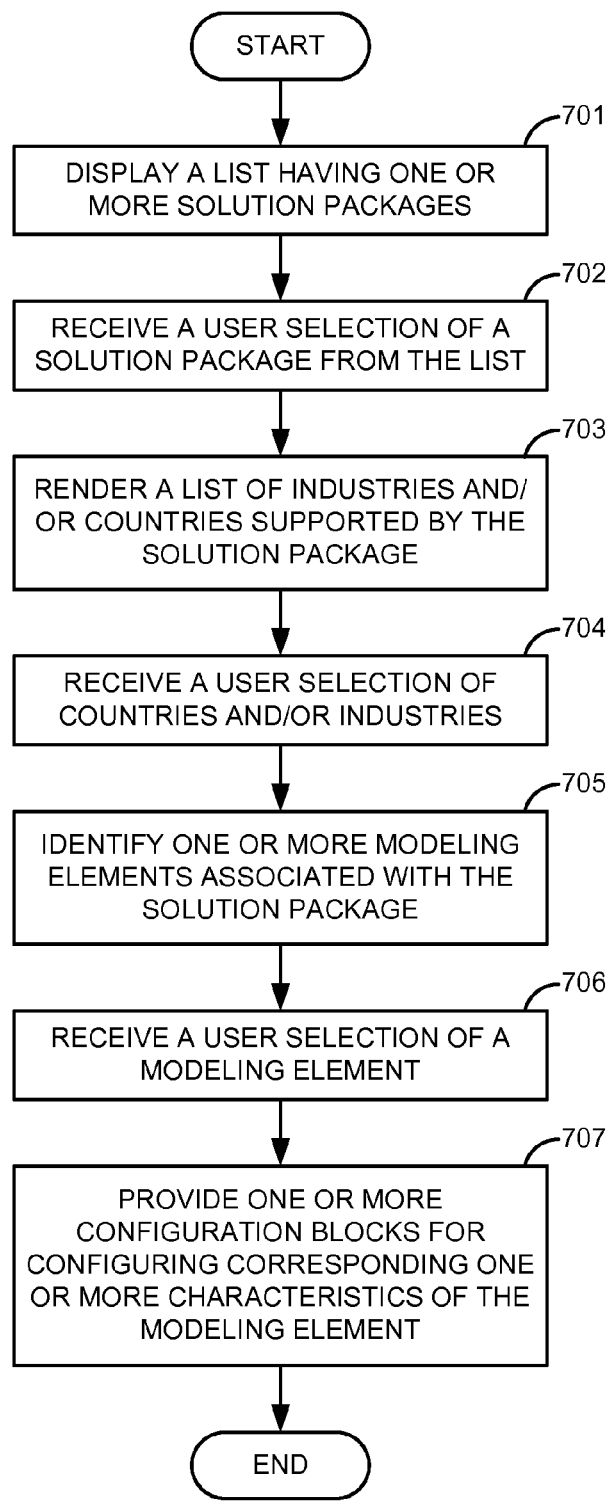
FIG. 7 is a flow chart illustrating the steps performed to manage characteristics variation within solution package(s), according to various embodiments of the invention.

FIG. 7 is a flowchart illustrating a method for managing characteristics variation within the solution packages 110 (1-*n*). The list 130 including the one or more solution packages 110 (1-*n*) is displayed at step 701. The user selects the solution package 110(1) from the list 130 at step 702. Essentially, the user selects the identifier corresponding to the solution package 110(1) to select the solution package 110(1). The list 140 including the countries (C1-Cn) and/or the industries (I1-Im) supported by the solution package 110(1) is rendered at step 703. Essentially, the solution package 110(1) is applicable for the countries (C1-Cn) and the industries (I1-Im). The user selects the country C1 and/or the industry I1 from the list 140 at step 704. Based upon the selection, the characteristics management module 120 identifies the BOM 150 including the one or more modeling elements (160-190) associated with the solution package 110(1) at step 705. The user may need to configure the one or more modeling elements (160-190) based upon the user's requirement. The user may select the modeling element 190 that needs to be configured at step 706. The modeling element 190 has the one or more characteristics associated with it. Essentially, each of the characteristics (e.g., country and industry) of the modeling element may be configured by the user. The characteristics management module 120 provides the one or more configuration blocks for configuring the corresponding one or more characteristics of the modeling element 190 at step 707. For example, the characteristics management module 120 may provide the configuration blocks 220 (1-2) for configuring the country and the industry characteristics, respectively, of the modeling element 190.

Figure 8:
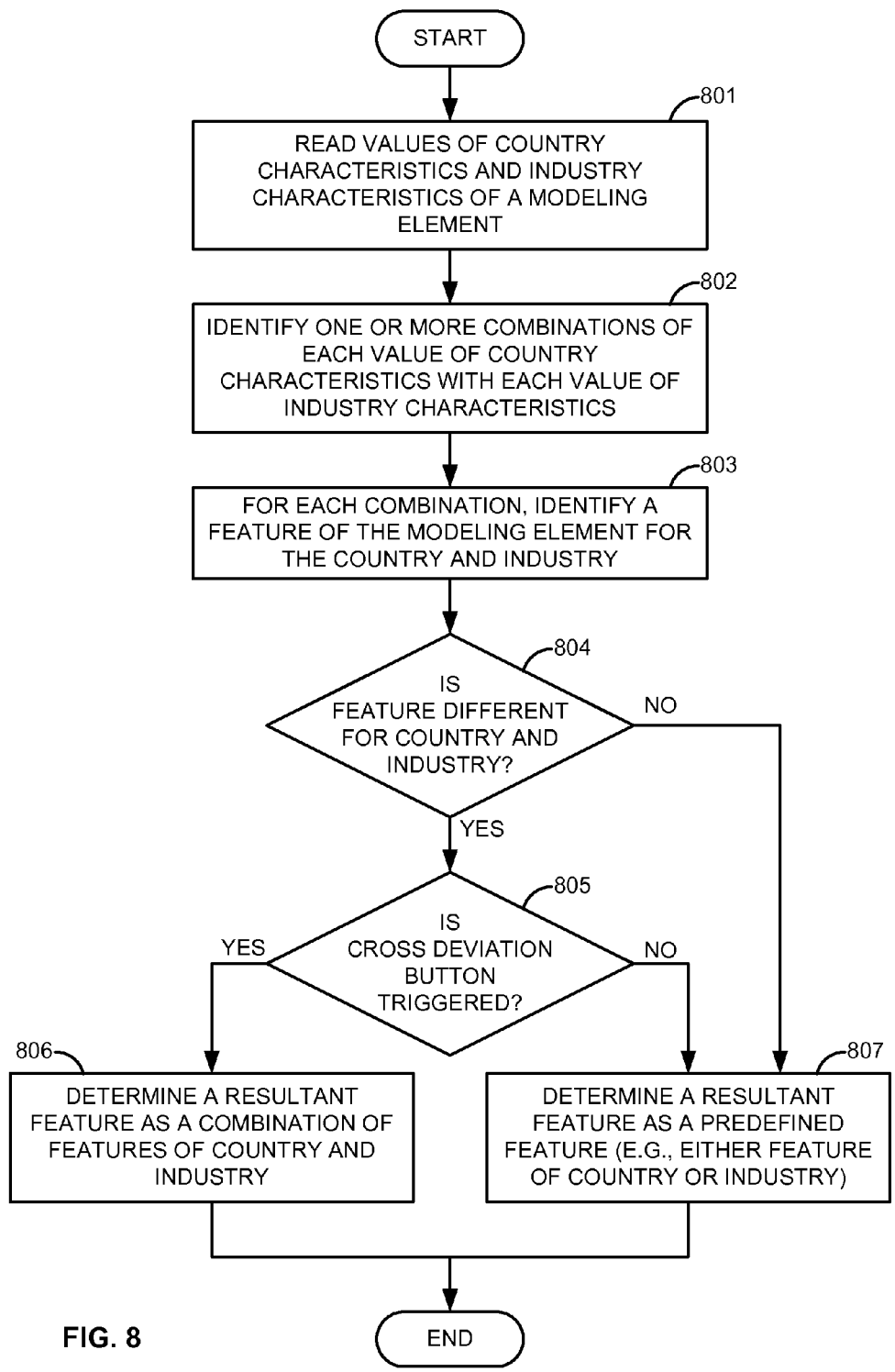
FIG. 8 is a flow chart illustrating the steps performed to determine a resultant feature of the modeling element in case of deviation, according to an embodiment of the invention.

FIG. 8 is a flowchart illustrating a method for determining the resultant feature in case of deviation. Essentially, once the modeling elements (e.g., the process step 190) is configured, the characteristics management module 120 reads the value (s) of the country characteristic and the value(s) of the industry characteristics of each modeling element (e.g., process step 190) at step 801. The one or more combinations of each value of the country characteristic with each value the industry characteristic is identified at step 802. For each combination, the feature of the modeling element (e.g., the process step 190) is read/identified for the country and the industry at step 803. If the feature is same (step 804: NO), the resultant feature is the predefined feature (e.g., it may be either of the feature of the value of country or industry). If the feature is different for the country and the industry (step 804: YES), it is determined if the cross deviation button (icon) is triggered at step 805. If the cross deviation button is triggered (step 805: YES), the deviation rule is applied and the resultant feature may be determined as the combination of the feature of the country and the industry at step 806. In one embodiment, the deviation rule may be that if there is a deviation or difference in feature for the country and industry value, the resultant feature may be the predefined feature. The predefined feature may be specified by the user or the predefined feature may be one of the features of one of the characteristics. If the cross deviation button is not triggered (step 805: NO), the resultant feature may be determined as the predefined feature at step 807.

The embodiments of the invention enable an easy and efficient configuration of the modeling element (e.g., business scenario, business process, process step, etc.). Essentially, the modeling element can be configured for various characteristics, e.g., the country (globalization variations) and industry (verticalisation variations). The applicability or visibility of the modeling elements can be easily guided or configured. Further, the modeling elements of various levels (higher level: business scenario to lower level: process step) can be configured. The configuration of the modeling elements from business scenario to process step makes the solution packages very flexible. Moreover, the country and the industry characteristics of the modeling element can be easily configured using the configuration block(s) (e.g., the country configuration block and the industry configuration block). Essentially, a separate configuration block is provided for configuring each characteristic of the modeling element. Additionally, the user (e.g., the software consultant) may not be required to analyze/consider the deviation in the feature (e.g., name, description, etc.) of the modeling element for the value of the country and the industry in the combination (i.e., the country/industry combination) to generate the configuration list. Essentially, the configuration list may be automatically generated by determining different combinations (country/industry combinations) and by determining the resultant feature for each combination. Actually, the characteristics management module 120 (i.e., the verticalisation and the localization management module) automatically provides the resultant feature for different combinations using the deviation rule.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 9:
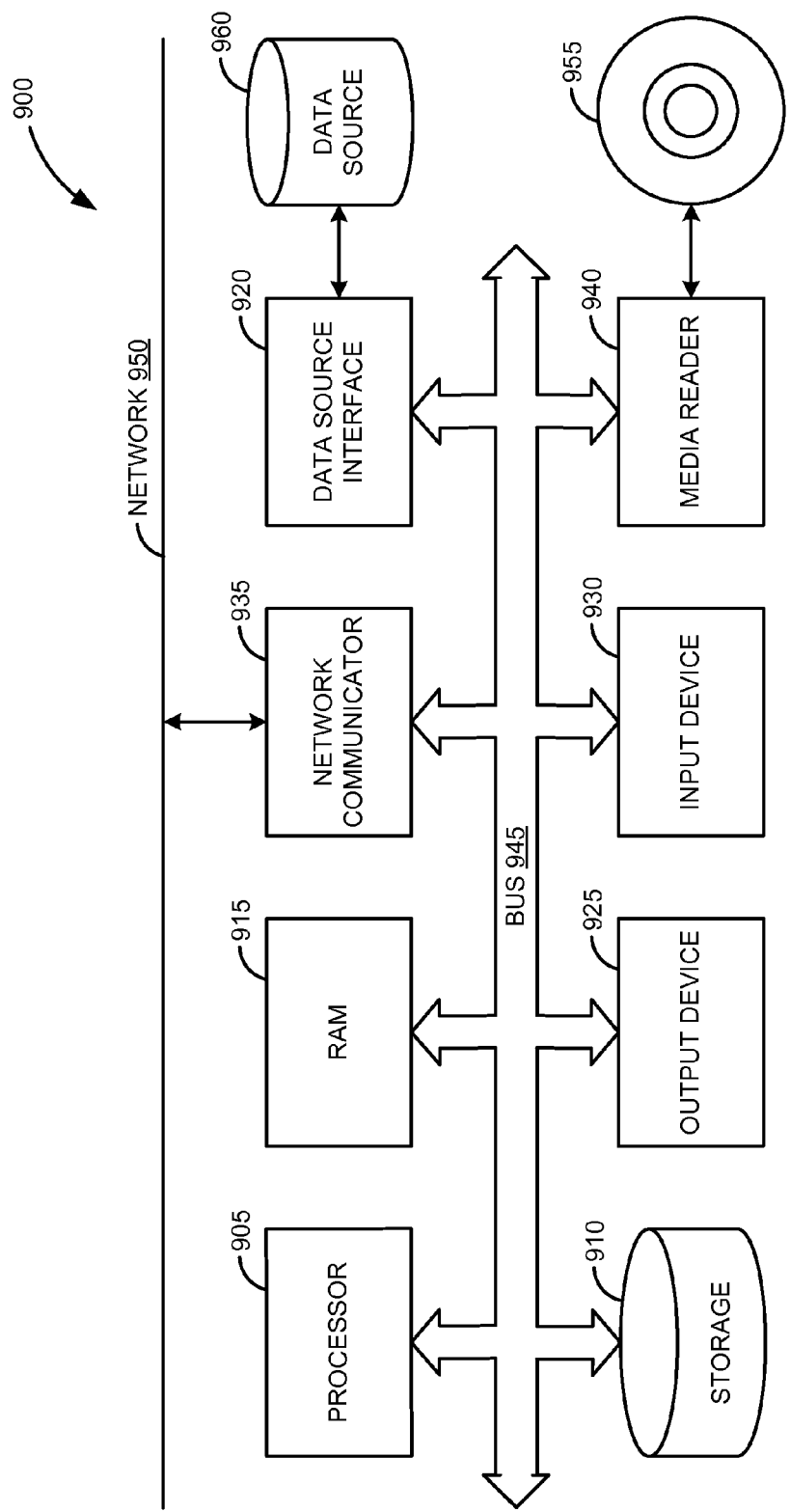
FIG. 9 is a block diagram of an exemplary computer system, according to an embodiment of the invention.

FIG. 9 is a block diagram of an exemplary computer system 900. The computer system 900 includes a processor 905 that executes software instructions or code stored on a computer readable storage medium 955 to perform the above-illustrated methods of the invention. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment of the invention, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system, e.g., an ERP system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:

display one or more identifiers corresponding to one or more solution packages;

receive a user selection of a solution package from the one or more solution packages;

based upon the selection of the solution package, render a list including at least one of one or more industries and one or more countries supported by the selected solution package;

receive a user selection of at least one of one or more countries and one or more industries from the rendered list;

based upon the selection of the at least one of the one or more countries and the one or more industries, render a bill-of-material (BOM) including one or more modeling elements associated with the solution package;

receive a user selection of a modeling element from the one or more modeling elements, wherein the modeling element comprises one or more characteristics; and based upon the user selection of the modeling element, provide one or more configuration blocks to configure the selected solution package by setting the corresponding one or more characteristics of the modeling element.

2. The article of manufacture of claim 1, wherein the identifier comprises at least one of textual labels and symbols and the modeling element comprises a business scenario, a business process associated with the business scenario, or a process step associated with the business process, and wherein the characteristic comprises a country, an industry, or a product associated with the modeling element.

3. The article of manufacture of claim 1, wherein the configuration block comprises:

a selectable core to specify one or more predefined values of the characteristic; and a characteristic vector to specify one or more user specified values of the characteristic, wherein the characteristic vector includes at least two fields and wherein one of the two fields is configured to receive one or more values of the characteristic and another of the two fields is configured to receive a selection criteria for respective values of the characteristic.

4. The article of manufacture of claim 3, wherein the selection criteria comprises one of:

an option for including the value of the characteristic; and an option for excluding the value of the characteristic.

5. The article of manufacture of claim 3, wherein when the core is selected, the modeling element is applicable for the predefined values of the characteristic except for the values excluded by the selection criteria and wherein when the core is unselected, the modeling element is applicable for one of:

the one or more values of the characteristic included by the selection criteria; and one or more predefined values of the characteristics.

6. The article of manufacture of claim 3, wherein the modeling element has a plurality of values corresponding to a plurality of characteristics and wherein when a feature of the modeling element is different for at least two of the plurality of values, a resultant feature of the modeling element applicable for combination of the two values is determined by a deviation rule.

7. The article of manufacture of claim 6, wherein the feature comprises one of:

a name of the modeling element;

a description of the modeling element; and a flow diagram of the modeling element.

8. The article of manufacture of claim 6, wherein the deviation rule includes the resultant feature as one of:

a combination of features of each of the plurality of values; and a predefined feature.

9. A computer-implemented method for managing characteristics variations within solution packages, the method comprising:
    displaying one or more identifiers corresponding to one or more solution packages;
    receiving a user selection of a solution package from the one or more solution packages;
    based upon the selection of the solution package, rendering a list comprising two columns, wherein one of the two columns includes a plurality of industries supported by the selected solution package and another of the two columns includes a plurality of countries supported by the selected solution package;
    receiving a user selection of at least one country from the plurality of countries and at least one industry from the plurality of industries from the rendered list;
    based upon the selection of the at least one country and the at least one industry, identifying one or more modeling elements associated with the solution package;
    receiving a user selection of a modeling element from the one or more modeling elements, wherein the modeling element comprises one or more characteristics; and
    based upon the user selection of the modeling element, providing one or more configuration blocks to configure the selected solution package by setting the corresponding one or more characteristics of the modeling element.

10. The method of claim 9, wherein the identifier comprises at least one of textual labels and symbols and the modeling element comprises a business scenario, a business process associated with the business scenario, or a process step associated with the business process, and wherein the characteristic comprises a country, an industry, or a product associated with the modeling element.

11. The method of claim 9 further comprising:
    providing a selectable core within the configuration block to specify one or more predefined values of the characteristic; and
    providing a characteristic vector within the configuration block to specify one or more user specified values of the characteristic, wherein the characteristic vector includes at least two fields and wherein one of the two fields is configured to receive one or more values of the characteristic and another of the two fields is configured to receive a selection criteria for respective values of the characteristic.

12. The method of claim 11, wherein the selection criteria comprises one of:
    an option for including the value of the characteristic; and
    an option for excluding the value of the characteristic.

13. The method of claim 12, wherein when the core is selected the modeling element is applicable for the predefined values of the characteristic except for the values excluded by the selection criteria and wherein when the core is unselected, the modeling element is applicable for one of:
    the one or more values of the characteristic included by the selection criteria; and
    one or more predefined values of the characteristics.

14. The method of claim 11, wherein the modeling element comprises a plurality of values corresponding to a plurality of characteristics and wherein when a feature of the modeling element is different for at least two of the plurality of values, a resultant feature of the modeling element applicable for combination of the two values is one of:
    the resultant feature is a predefined feature; and
    the resultant feature is a combination of features of each of the plurality of values.

15. A computer system for managing characteristics variations within solution packages, comprising:
    a memory to store program code; and
    a processor communicatively coupled to the memory, the processor configured to execute the program code to:
        display one or more identifiers corresponding to one or more solution packages;
        receive a user selection of a solution package from the one or more solution packages;
        based upon the selection of the solution package, render a list including at least one of one or more industries and one or more countries supported by the selected solution package;
        receive a user selection of at least one of one or more countries and one or more industries from the rendered list;
        based upon the selection of the at least one of the one or more countries and the one or more industries, render a bill-of-material (BOM) including one or more modeling elements associated with the solution package;
        receive a user selection of a modeling element from the one or more modeling elements, wherein the modeling element comprises one or more characteristics; and
        based upon the user selection, provide one or more configuration blocks to configure the selected solution package by setting the corresponding one or more characteristics of the modeling element.

16. The system of claim 15, wherein the identifier comprises at least one of textual labels and symbols and the modeling element comprises a business scenario, a business process associated with the business scenario, or a process step associated with the business process, and wherein the characteristic comprises a country, an industry, or a product associated with the modeling element.

17. The system of claim 15, wherein the configuration block comprises:
    a selectable core to specify one or more predefined values of the characteristic; and
    a characteristic vector to specify one or more user specified values of the characteristic, wherein the characteristic vector includes at least two fields and wherein one of the two fields is configured to receive one or more values of the characteristic and another of the two fields is configured to receive a selection criteria for respective values of the characteristic.

18. The system of claim 17, wherein the selection criteria comprises one of:
    an option for including the value of the characteristic; and
    an option for excluding the value of the characteristic.

19. The system of claim 18, wherein when the core is selected the modeling element is applicable for the predefined values of the characteristic except for the values excluded by the selection criteria and wherein when the core is unselected, the modeling element is applicable for one of:
    the one or more values of the characteristic included by the selection criteria; and
    one or more predefined values of the characteristic.

20. The system of claim 17, wherein the modeling element comprises a plurality of values corresponding to a plurality of characteristics and wherein when a feature of the modeling element is different for at least two of the plurality of values, a resultant feature of the modeling element applicable for combination of the two values is determined by one of:

the resultant feature is a combination of features of each of the plurality of values; and
the resultant feature is a predefined feature.

* * * * *